May 20, 1952     A. MACBETH     2,597,649
SCAFFOLDING CLIP OR CLAMP
Filed Aug. 5, 1947
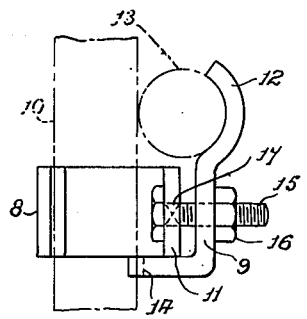
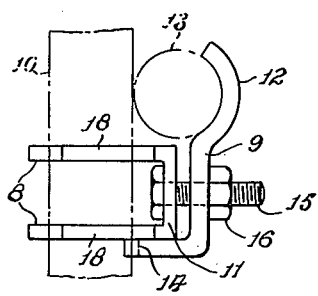
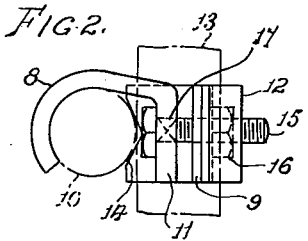
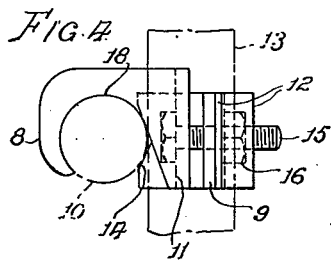
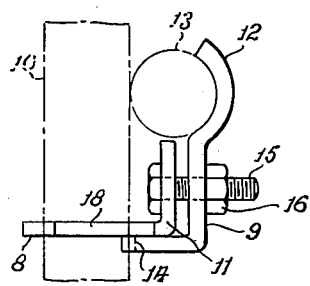
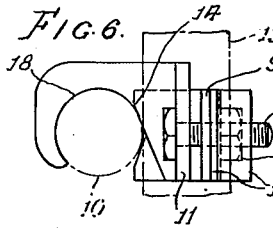
ALLAN MACBETH
by Albert M. Austin
his ATTORNEY.

Patented May 20, 1952

2,597,649

UNITED STATES PATENT OFFICE 2,597,649

SCAFFOLDING CLIP OR CLAMP

Allan Macbeth, Fernhurst, England

Application August 5, 1947, Serial No. 766,378
In Great Britain April 29, 1944

Section 1, Public Law 690, August 8, 1946
Patent expires April 29, 1964

6 Claims. (Cl. 287—54)

This invention has reference to scaffolding clips or clamps for clamping two tubular or other scaffolding and like members in angular relation and to such clips or clamps of the kind comprising a hook part adapted to engage with or hook on to one of the scaffolding or like members, a clamping part adapted to engage the second member, and means for drawing the two clip or clamp parts towards each other so that the scaffolding or like members are pressed against each other and clamped between the clip or clamp parts.

The invention has for its main object to provide a clip or clamp which will be efficient in use and cheap to produce.

The invention is hereinafter further described with reference to the accompanying drawings wherein Fig. 1 is an elevation and Fig. 2 is a plan of one form of scaffolding clip or clamp in accordance with the invention, for clamping two scaffolding members together at right angles, Fig. 3 is an elevation and Fig. 4 is a plan of a modified form of clip or clamp, Fig. 5 is an elevation and Fig. 6 is a plan of another modified form of clip or clamp.

On the drawings and in the following description like numerals of reference indicate like parts.

Referring first to Figs. 1 and 2 of the drawings, the clip or clamp illustrated comprises a hook part 8 and a clamping part 9 of the known more or less L-shape kind, both of said parts being produced from flat strip material. One end of the part 8 is bent to form a hook adapted to be hooked on or engaged with the scaffolding member indicated in dot-and-dash lines at 10. The other end of the part 8 is formed with a flange 11 which lies between the member 10 and the longer limb of the clamping part 9. The upper end of the longer limb of the clamping part 9 is fashioned with a transverse groove or recess 12 to partly embrace the second scaffolding member, indicated in dot-and-dash lines at 13, which is passed between said limb and the first member 10. The shorter limb of the part 9 bears against the member 10 and is formed with a notch or recess 14 to position it on or against said member. The flange 11 of the part 8 and the longer limb of the part 9 are formed with holes wherethrough passes the shank of a bolt 15 the tightening up of a nut 16 on which draws the parts 8 and 9 together and causes the members 10 and 13 to be pressed against each other and gripped between the parts 8 and 9.

The bolt 15 may be formed with a square neck 17 next its head and the hole in the flange 11 of the part 8 may be of corresponding shape to prevent rotation of the bolt during tightening and slackening of the nut 16. Alternatively, the shank of the bolt may be a forced fit in the hole in the flange 11 or the bolt may be screwed into the hole, or may be welded to the flange 11 and the end of its shank may be riveted over to prevent the nut 16 from being completely unscrewed and the parts 8 and 9 from being separated.

The flange 11 is preferably of such dimensions or shape as to engage against the shorter limb of the clamping part 9 and thereby prevent turning of the part 8 relatively to the part 9.

In the clip or clamp shown in Figs. 3 and 4 the hook part 8 is of more or less U-shape, the bight or closed end of the part constituting the flange 11 and the limbs of the part being recessed as at 18 to form hooks for engagement with the scaffolding member 10.

In the clip or clamp shown in Figs. 5 and 6 the part 8 is of angular shape but turned through 90° compared with the part 8 shown in Figs. 1 and 2, the hook being formed by recessing its longer limb at 18 similarly to the limbs of the part 8 shown in Figs. 3 and 4.

For clamping two members such as 10 and 13 at right angles to each other the transverse groove or recess will be normal to the longer limb of the part 9, Figs. 1 to 6, while for clamping members in other angular relation the groove or recess will be correspondingly inclined to the limb or the strap or keep.

I claim:

1. A fitting for clamping together in angular relationship two bars of a scaffold at their point of crossing, the fitting comprising a hook member made from flat strip material and including a flange portion, a lateral portion angularly extending from the flange portion, and a hook portion extending from the lateral portion opposite said flange portion, the hook portion being curved back towards the flange portion, the hook member being open opposite the lateral portion to permit attachment to, and removal from, a scaffold bar, the flange portion having a hole therein; a substantially L-shaped clamp member made from flat strip material, said clamp member having a central flange portion adapted to lie substantially parallel with the flange portion of the hook member in clamping position of the fitting, the flange portion of the clamp member having a hole therein, one end portion of the clamp member being curved for engagement with the crossing scaffold bar, the other end portion of the clamp member being bent at substantially right angles with respect to the flange portion, said other end portion having an edge for engaging the scaffold bar embraced by said hook member; and a screw-threaded bolt passing through the hole in the flange portion of the clamp member, the bolt being fitted with a nut for drawing the hook member and clamp member towards each other, the other end portion of the clamp member extending parallel with, and engaging, said hook member to prevent turning of said clamp member with respect to said hook member upon drawing together of the members by means of said nut.

2. A fitting for clamping together in angular relationship two bars of a scaffold at a point of crossing the fitting comprising a hook member made from flat strip material and including a flange portion and a hook portion, said portions lying on opposite sides with respect to the axis of the bar to be engaged by the hook member, the flange portion having a hole therein, the hook portion being bent at substantially right angles with respect to the flange portion and having stock cut therefrom substantially of the cross sectional area of the bar to be engaged to form a hook engaging, with its internal edge, the bar oppositely said flange portion; a clamp member made from flat strip material, said clamp member having a flange portion adapted to lie substantially parallel with the flange portion of the hook member in clamping position of the fitting, the flange portion of the clamp member having a hole, the clamp member further including a curved portion for engaging a scaffold bar crossing the bar engaged by the hook member; and a screw-threaded bolt passing through the hole in the flange portion of the hook member and through the hole in the flange portion of the clamp member, the bolt being fitted with a nut for drawing the hook member and clamp member towards each other.

3. A fitting for clamping together in angular relationship two bars of a scaffold at a point of crossing the fitting comprising a hook member made from flat strip material and including a central flange portion and two terminal portions extending at right angles to said central flange portion, the flange portion having a hole, the terminal portions having stock cut therefrom substantially of the cross sectional area of the bar to be engaged to form two aligned and substantially parallel hooks adapted to engage, with their internal edges, the bar oppositely said flange portion; a clamp member made from flat strip material, said clamp member having a flange portion adapted to lie substantially parallel with the flange portion of the hook member in clamping position of the fitting, the flange portion of the clamp member having a hole therein, the clamp member further including a curved portion for engaging a scaffold bar crossing the bar engaged by the hook member; and a screw-threaded bolt passing through the hole in the flange portion of the hook member and through the hole in the flange portion of the clamp member, the bolt being fitted with a nut for drawing the hook member and clamp member towards each other.

4. A fitting for clamping together in angular relationship two bars of a scaffold at the point of crossing the fitting comprising a hook member made from flat strip material and including a flange portion and an end portion bent at right angles with respect to the flange portion, the flange portion having a hole, the end portion having stock cut therefrom substantially of the cross sectional area of the bar to be engaged to form a hook embracing with its internal edge the bar oppositely said flange portion; a substantially L-shaped clamp member made from flat strip material, said clamp member having a central flange portion adapted to lie substantially parallel with the flange portion of the hook member in clamping position of the fitting, the flange portion of the clamp member having a hole therein, one end portion of the clamp member being curved for engagement with the crossing scaffold bar, the other end portion of the clamp member being bent at substantially right angles with respect to the flange portion, said other end portion having an edge for engaging the scaffold bar embraced by said hook member; and a screw-threaded bolt passing through the hole in the flange portion of the hook member and through the hole in the flange portion of the clamp member, the bolt being fitted with a nut for drawing the hook member and clamp member towards each other.

5. A fitting as set forth in claim 4 in which said other end portion of the clamp member extends parallel with, and engages, said hook member to prevent turning of said clamp member with respect to said hook member upon drawing together of the members by means of the nut.

6. A fitting for clamping together in angular relationship two bars of a scaffold at the point of crossing the fitting comprising a hook member made from flat strip material and including a central flange portion and two terminal portions extending at right angles to said central flange portion, the flange portion having a hole, the terminal portions having stock cut therefrom substantially of the cross sectional area of the bar to be engaged to form two aligned and substantially parallel hooks adapted to engage, with their internal edges, the bar oppositely said flange portion; a substantially L-shaped clamp member made from flat strip material, said clamp member having a central flange portion adapted to lie substantially parallel with the flange portion of the hook member in clamping position of the fitting, the flange portion of the clamp member having a hole therein, one end portion of the clamp member being curved for engagement with the crossing scaffold bar, the other end portion of the clamp member being bent at substantially right angles with respect to the flange portion, said other end portion having an edge for engaging the scaffold bar embraced by said hook member; and a screw-threaded bolt passing through the hole in the flange passing through the hole in the flange portion of the hook member and through the hole in the flange portion of the clamp member, the bolt being fitted with a nut for drawing the hook member and clamp member towards each other.

ALLAN MACBETH.

REFERENCES CITED

The following references are of record in the file of this patent:

UNITED STATES PATENTS

| Number | Name | Date |
|---|---|---|
| 561,263 | Lucas | June 2, 1896 |
| 2,217,004 | Carlson | Oct. 8, 1940 |

FOREIGN PATENTS

| Number | Country | Date |
|---|---|---|
| 523,297 | Great Britain | of 1940 |
| 564,855 | Great Britain | of 1944 |